United States Patent
Yoon et al.

(10) Patent No.: US 9,637,579 B2
(45) Date of Patent: *May 2, 2017

(54) ELASTIC TERPOLYMER INCLUDING DIENE GROUP AND PREPARATION METHOD THEREOF

(71) Applicant: LG CHEM, LTD., Seoul (KR)

(72) Inventors: Sung-Cheol Yoon, Daejeon (KR); Sung-Ho Park, Daejeon (KR); Jun-Seok Ko, Daejeon (KR); Soo-Young Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 68 days.

This patent is subject to a terminal disclaimer.

(21) Appl. No.: 14/442,382

(22) PCT Filed: Oct. 14, 2013

(86) PCT No.: PCT/KR2013/009155
§ 371 (c)(1),
(2) Date: May 12, 2015

(87) PCT Pub. No.: WO2014/208823
PCT Pub. Date: Dec. 31, 2014

(65) Prior Publication Data
US 2016/0272744 A1  Sep. 22, 2016

(30) Foreign Application Priority Data

Jun. 28, 2013  (KR) .................. 10-2013-0075873

(51) Int. Cl.
C08F 210/18 (2006.01)
C08F 236/20 (2006.01)
(Continued)

(52) U.S. Cl.
CPC ........ *C08F 210/18* (2013.01); *C08F 4/65904* (2013.01); *C08L 23/16* (2013.01);
(Continued)

(58) Field of Classification Search
CPC .. C08F 4/65904; C08F 4/6592; C08F 210/20; C08F 236/02; C08F 210/18;
(Continued)

(56) References Cited

U.S. PATENT DOCUMENTS

| | | | |
|---|---|---|---|
| 165,085 | A | 6/1875 | Evitt et al. |
| 976,131 | A | 11/1910 | McClellan |

(Continued)

FOREIGN PATENT DOCUMENTS

| | | |
|---|---|---|
| CN | 1150809 A | 5/1997 |
| CN | 1224433 A | 7/1999 |

(Continued)

OTHER PUBLICATIONS

"Contributed Lectures" Alexy, et al. Chem. Listy 103, p. 1-p. 148 (2009).

(Continued)

*Primary Examiner* — Caixia Lu
(74) *Attorney, Agent, or Firm* — Dentons US LLP

(57) ABSTRACT

The present invention relates to an elastic terpolymer which can satisfy excellent processability and elasticity (flexibility) at the same time, and a preparation method thereof. The elastic terpolymer is a copolymer of 40 to 70 weight % of ethylene, 15 to 55 weight % of a $C_3$-$C_{20}$ alpha-olefin, and 0.5 to 20 weight % of a diene obtained in the presence of a group 4 transition metal catalyst, of which i) the weight average molecular weight measured by GPC is 100,000 to 500,000, and ii) Δ tan δ, the difference between the tan δ values at the (Continued)

angular frequencies of 0.2 rad/s and 100.0 rad/s, is 0.5 or less that is measured at 100° C. by using a rubber process analyzer.

14 Claims, 4 Drawing Sheets

(51) Int. Cl.
| | |
|---|---|
| C08F 4/653 | (2006.01) |
| C08F 4/6592 | (2006.01) |
| C08L 23/16 | (2006.01) |
| C08F 4/659 | (2006.01) |

(52) U.S. Cl.
CPC ........ *C08F 4/6592* (2013.01); *C08F 4/65908* (2013.01); *C08F 2420/02* (2013.01); *C08L 2314/06* (2013.01)

(58) Field of Classification Search
CPC ............... C08F 236/20; C08L 23/0815; C08L 2314/06; C08L 23/26
See application file for complete search history.

(56) References Cited

U.S. PATENT DOCUMENTS

| | | | |
|---|---|---|---|
| 5,229,478 | A | 7/1993 | Floyd et al. |
| 5,902,867 | A | 5/1999 | Muskens et al. |
| 6,369,176 | B1 | 4/2002 | Laughner et al. |
| 6,403,520 | B1 | 6/2002 | Hamed et al. |
| 6,545,088 | B1 | 4/2003 | Kolthammer et al. |
| 7,750,104 | B2 | 7/2010 | Cady et al. |
| 2004/0087750 | A1 | 5/2004 | Agarwal et al. |
| 2007/0225158 | A1 | 9/2007 | Lee et al. |
| 2012/0108772 | A1 | 5/2012 | Lee et al. |
| 2012/0259077 | A1 | 10/2012 | Ha et al. |

FOREIGN PATENT DOCUMENTS

| | | |
|---|---|---|
| CN | 1254350 A | 5/2000 |
| CN | 1432046 A | 7/2003 |
| CN | 101277987 A | 10/2008 |
| CN | 101580559 A | 11/2009 |
| CN | 101679561 A | 3/2010 |
| CN | 102482366 A | 5/2012 |
| EP | 0521908 B1 | 7/1996 |
| EP | 1 113 028 B1 | 3/2004 |
| EP | 1237963 B1 | 9/2004 |
| EP | 2 093 240 A1 | 8/2009 |
| EP | 2881406 A1 | 6/2015 |
| EP | 2883890 A1 | 6/2015 |
| EP | 2883891 A1 | 6/2015 |
| EP | 2902421 A1 | 8/2015 |
| EP | 3000832 A1 | 3/2016 |
| JP | 9-512848 A | 12/1997 |
| JP | 2005-517068 A | 6/2005 |
| JP | 2008527050 A1 | 7/2008 |
| JP | 2011-500937 A | 1/2011 |
| JP | 2012531503 A | 12/2012 |
| JP | 2013510221 A | 3/2013 |
| KR | 1996-0014912 B1 | 10/1996 |
| KR | 10-2000-0052136 A | 8/2000 |
| KR | 10-2001-0020395 A | 3/2001 |
| KR | 10-2001-0032325 A | 4/2001 |
| KR | 10-2002-0064334 A | 8/2002 |
| KR | 10-2002-0091084 A | 12/2002 |
| KR | 10-0411923 B1 | 12/2003 |
| KR | 10-0488833 B1 | 5/2005 |
| KR | 10-0535582 B1 | 12/2005 |
| KR | 10-2006-0054293 A | 5/2006 |
| KR | 10-0820542 B1 | 4/2008 |
| KR | 10-2008-0099529 A | 11/2008 |
| KR | 10-2008-0101542 A | 11/2008 |
| KR | 10-2009-0027212 A | 3/2009 |
| KR | 10-2009-0116737 A | 11/2009 |
| KR | 10-2010-0081485 A | 7/2010 |
| KR | 10-2010-0090714 A | 8/2010 |
| KR | 10-0976131 B1 | 8/2010 |
| KR | 10-2011-0002153 A | 1/2011 |
| KR | 10-2011-0017072 A | 2/2011 |
| KR | 10-2012-0016596 A | 2/2012 |
| KR | 10-2012-0101683 A | 9/2012 |
| KR | 10-1237574 B1 | 2/2013 |
| KR | 10-1262305 B1 | 5/2013 |
| KR | 10-2013-0087736 A | 8/2013 |
| KR | 10-2013-0090844 A | 8/2013 |
| KR | 10-1367402 B1 | 2/2014 |

OTHER PUBLICATIONS

"Carbon-13 NMR of Ethylene-1-Olefin Copolymers:Extension to the Short-Chain Branch Distribution in a Low-Density Polyethylene"; Randall; Journal of Polymer Science: Polymeo Physics Edition vol. 11, 275-287 (1973).

"Structural Determination of Ethylene-Propylene-DieneRubber (EPDM) Containing High Degree of Controlled Long-Chain Branching" Mitra, et al.; Journal of Applied Polymer Science,vol. 113, 2962-2972 (2009) VVC 2009 Wiley Periodicals, Inc.

"13C NMR Determination of Monomer Sequence Distribution inEthylene-Propylene Copolymers Prepared with 6-TiC13-Al( C2H5%) C1" Kakugo, et al.; Macromolecules 1982,15, 1150-1152.

Henri G. Burhin et al., An Innovative Method to Investigate Polymer Long Chain Branching with FT-Rheology and Large Amplitude Oscillatory Shear (LAOS), Chem Listy 103, 2009, pp. s48-s51.

Office Action of Japanese Patent Office in Appl'n No. 2015-527402, dated Mar. 1, 2016.

Office Action of Chinese Patent Office in Appl'n No. 201380053911.4, dated Dec. 28, 2015.

Search Report of European Patent Office in Appl'n No. 14818626.5, dated Apr. 29, 2016.

Search Report of European Patent Office in Appl'n No. 14816719.0, dated May 3, 2016.

Search Report of European Patent Office in Appl'n No. 13888269.1, dated Jun. 9, 2016.

Search Report of European Patent Office in Appl'n No. 14817033.5, dated Jun. 20, 2016.

Office Action of Chinese Patent Office in Appl'n No. 201480002702.1, dated Apr. 21, 2016.

Office Action of Chinese Patent Office in Appl'n No. 201480002698.9, dated Jun. 1, 2016.

Office Action of Chinese Patent Office in Appl'n No. 201480002718.2, dated Jun. 8, 2016.

Office Action of Korean Patent Office in Appl'n No. 10-2014-0047679, dated Jun. 13, 2016.

ELASTIC TERPOLYMER INCLUDING DIENE GROUP AND PREPARATION METHOD THEREOF

This application is a National Stage Application of International Application No. PCT/KR2013/009155, filed on Oct. 14, 2013, and claims the benefit of Korean Patent Application No. 10-2013-0075873, filed on Jun. 28, 2013, all of which are hereby incorporated by reference in their entirety for all purposes as if fully set forth herein.

TECHNICAL FIELD

The present invention relates to an elastic terpolymer that is a copolymer of ethylene, alpha-olefin, and diene, and a preparation method thereof. More specifically, the present invention relates to an elastic terpolymer having a long-chain branch which can satisfy processability and elasticity (flexibility) at the same time, and a preparation method thereof.

BACKGROUND OF ART

EPDM rubber, an elastic terpolymer of ethylene, an alpha-olefin such as propylene, and a diene such as ethylidene norbornene, has the molecular structure not including an unsaturated bond in the main chain, and has the characteristics of weather resistance, chemical resistance, and heat resistance that are superior to general conjugated diene rubbers. Due to the characteristics, the elastic terpolymer such as the EPDM rubber has been widely used as a material for the industrial materials such as for all sorts of automobile parts, electrical wire, construction and all sorts of hoses, gaskets, belts, bumpers, and a blend with plastics.

The elastic terpolymer such as the EPDM rubber has been mostly prepared by copolymerizing 3 kinds of monomers in the presence of a catalyst including a vanadium compound, for example, a vanadium-based Ziegler-Natta catalyst. However, since the vanadium-based catalyst has low catalytic activity, there is a need to use an excess amount of catalyst and a disadvantage that a residual metal content increases in the terpolymer. Therefore, processes for catalyst elimination and decolorization are required after the preparation of the terpolymer, and the residual catalyst in the resin may cause problems of heat resistance deterioration, impurity generation, hindrance to a vulcanization reaction, and so on. Further, it has not been easy to prepare the elastic terpolymer by using the catalyst including a vanadium compound due to its low polymerization activity and the polymerization condition of a low temperature, and it has been difficult to control the molecular structure of the copolymer because it has not been easy to control the uptake rate of comonomers such as propylene and diene. Therefore, in the case of using the vanadium-based catalyst, there has been a limit on the preparation of the elastic terpolymer with various properties. Recently, because of the problems, a method of preparing the elastic terpolymer, such as the EPDM rubber, by using a metallocene-based group 4 transition metal catalyst instead of the vanadium-based Ziegler-Natta catalyst, has been under development.

Such group 4 transition metal catalyst shows high polymerization activity in the polymerization of olefins, and makes it possible not only to prepare a copolymer having a higher molecular weight but also to easily control the molecular weight distribution and the composition of the copolymer. Furthermore, it has an advantage of enabling the copolymerization of various comonomers. For example, U.S. Pat. Nos. 5,229,478 and 6,545,088, and Korea Pat. No. 0,488,833 disclose that an elastic terpolymer having a high molecular weight can be obtained with excellent polymerization activity by using various metallocene-based group 4 transition metal catalysts obtained from the ligands such as cyclopentadienyl, indenyl, fluorenyl, and so on.

However, in the case of polymerizing 3 kinds of monomers by using existing group 4 transition metal catalysts, there has been a disadvantage that the repeating units derived from the monomers are unevenly distributed in the terpolymer chain due to their high reactivity to the comonomers of alpha-olefin. As a result, it has been difficult to obtain the elastic terpolymer such as the EPDM rubber having excellent elasticity and flexibility.

Further, U.S. Pat. No. 5,902,867 discloses the method of lowering the viscosity of the polymer by widening the molecular weight distribution for improving the mixing processability and the extrusion processability of the EPDM, but there is a problem that the polymer is degraded during the process by the low molecular components included in the cross-linked rubber product, and the surface characteristics and the low temperature characteristics decrease.

Therefore, it has been continuously required to develop an elastic terpolymer that can satisfy excellent processability, mechanical properties, and elasticity (flexibility) at the same time, and a preparation method that can prepare the elastic terpolymer with high productivity and yield rate.

PRIOR ART DOCUMENTS

Patent Documents (Patent Document 0001) U.S. Pat. No. 5,229,478
(Patent Document 0002) U.S. Pat. No. 6,545,088
(Patent Document 0003) Korean Pat. No. 0,488,833

DETAILED DESCRIPTION OF THE INVENTION

Technical Problem

It is an aspect of the present invention to provide an elastic terpolymer having a long-chain branch which can satisfy excellent processability and elasticity (flexibility) at the same time.

It is another aspect of the present invention to provide a preparation method thereof which can produce the elastic terpolymer having a long-chain branch with high productivity.

Technical Solution

The present invention provides an elastic terpolymer of 40 to 70 weight % of ethylene, 15 to 55 weight % of a $C_3$-$C_{20}$ alpha-olefin, and 0.5 to 20 weight % of a diene obtained in the presence of a group 4 transition metal catalyst, of which i) the weight average molecular weight measured by GPC is 100,000 to 500,000, and ii) $\Delta \tan \delta$, the difference between the $\tan \delta$ values at the angular frequencies of 0.2 rad/s and 100.0 rad/s measured at 100° C. by using a rubber process analyzer, is 0.5 or less.

The present invention also provides a method of preparing the elastic terpolymer, including the step of copolymerizing the monomer composition including 40 to 70 weight % of ethylene, 20 to 50 weight % of a $C_3$-$C_{20}$ alpha-olefin, and 2 to 20 weight % of a diene while continuously feeding the composition into a reactor, in the presence of the catalyst composition including a first transition metal compound represented by the following Chemical Formula 1 and a second transition metal compound represented by the following Chemical Formula 2.

[Chemical Formula 1]

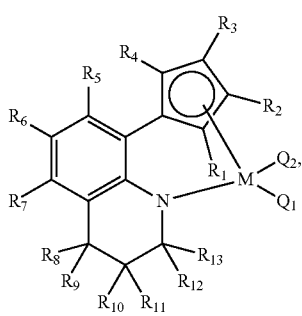

[Chemical Formula 2]

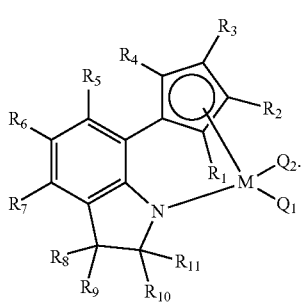

In Chemical Formulae 1 and 2, $R_1$ to $R_{13}$ may be equal to or different from each other, and may independently be hydrogen, a $C_1$-$C_{20}$ alkyl radical, a $C_2$-$C_{20}$ alkenyl radical, a $C_6$-$C_{20}$ aryl radical, a silyl radical, a $C_7$-$C_{20}$ alkylaryl radical, a $C_7$-$C_{20}$ arylalkyl radical, or a metalloid radical of a group 4 metal substituted with a hydrocarbyl, wherein the 2 different neighboring groups among $R_1$ to $R_{13}$ may form an aliphatic ring or an aromatic ring by being connected with an alkylidene radical including a $C_1$-$C_{20}$ alkyl or a $C_6$-$C_{20}$ aryl radical;

M is a group 4 transition metal; and $Q_1$ and $Q_2$ may be equal to or different from each other, and may independently be a halogen radical, a $C_1$-$C_{20}$ alkyl radical, a $C_2$-$C_{20}$ alkenyl radical, a $C_6$-$C_{20}$ aryl radical, a $C_7$-$C_{20}$ alkylaryl radical, a $C_7$-$C_{20}$ arylalkyl radical, a $C_1$-$C_{20}$ alkylamido radical, a $C_6$-$C_{20}$ arylamido radical, or a $C_1$-$C_{20}$ alkylidene radical.

Hereinafter, the elastic terpolymer according to a specific embodiment of the present invention and the method of preparing the same are explained in more detail.

First of all, the term 'elastic terpolymer' used in this description may be defined as follows, unless there is particular mention about it. The term 'elastic terpolymer' may refer to an arbitrary elastic copolymer (for example, a cross-linkable random copolymer) copolymerized from 3 kinds of monomers of ethylene, a $C_3$-$C_{20}$ alpha-olefin, and a diene. A representative example of such 'elastic terpolymer' is the EPDM rubber, which is a copolymer of ethylene, propylene, and a diene. However, the term 'elastic terpolymer' is not limited to only the copolymer of the three monomers, and it goes without saying that it may include an arbitrary elastic copolymer prepared from one or more monomers belonging to the category of alpha-olefin and one or more monomers belonging to the category of diene in company with ethylene. For example, as the elastic copolymer of ethylene, 2 kinds of alpha-olefins of propylene and 1-butene, and 2 kinds of dienes of ethylidene norbornene and 1,4-hexadiene, may also belong to the category of the 'elastic terpolymer' because it is copolymerized from 3 kinds of monomers respectively belonging to the categories of ethylene, alpha-olefin, and diene.

Meanwhile, according to one embodiment of the present invention, an elastic terpolymer of 40 to 70 weight % of ethylene, 15 to 55 weight % of a $C_3$-$C_{20}$ alpha-olefin, and 0.5 to 20 weight % of a diene obtained in the presence of a group 4 transition metal catalyst, of which i) the weight average molecular weight measured by GPC is 100,000 to 500,000, and ii) $\Delta$ tan $\delta$, the difference between the tan $\delta$ values at the angular frequencies of 0.2 rad/s and 100.0 rad/s measured at 100° C. by using a rubber process analyzer, is 0.5 or less, is provided.

Such elastic terpolymer of one embodiment is copolymerized from 3 kinds of monomers of ethylene, an alpha-olefin, and a diene in a certain content range, and has a relatively high weight average molecular weight of about 100,000 to 500,000, or about 100,000 to 400,000, measured by GPC. Such a high weight average molecular weight is achieved by excellent activity of the group 4 transition metal catalyst, for example, the first and second transition metal compounds belonging to the metallocene series represented by Chemical Formulae 1 and 2 disclosed below, and since the elastic terpolymer of one embodiment has such a high molecular weight, the elastic terpolymer, for example, the EPDM rubber, can show excellent mechanical properties.

Further, the elastic terpolymer of one embodiment may show $\Delta$ tan $\delta$ of 0.5 or less, which is the difference between the tan $\delta$ values at the angular frequencies of 0.2 rad/s and 100.0 rad/s measured at 100° C., determined using a rubber process analyzer.

Particularly, the elastic terpolymer includes 3 uniformly alternating kinds of repeating units derived from ethylene, alpha-olefin, and diene with a proper content range and includes a long-chain branch because of including a specific diene, and can show $\Delta$ tan $\delta$ of 0.5 or less, which is the difference between the tan $\delta$ values at the angular frequencies of 0.2 rad/s and 100.0 rad/s. Therefore, the elastic terpolymer can satisfy excellent mechanical properties suitable for extrusion processing and more improved elasticity and flexibility at the same time.

The elastic terpolymer according to one embodiment, for example, may be prepared with excellent productivity and yield rate unique to the group 4 transition metal catalyst belonging to the metallocene series, and it can satisfy excellent elasticity and flexibility in addition to high molecular weight and excellent mechanical properties according to this, while resolving the problems of the EPDM rubber prepared by an existing metallocene-type group 4 transition metal catalyst.

Further, the tan $\delta$ value of the elastic terpolymer at the angular frequency of 0.2 rad/s measured at 100° C. by using a rubber process analyzer may be 0.45 to 0.8. The elastic copolymer showing a low tan $\delta$ value of such a range at the angular frequency of 0.2 rad/s is the polymer having a long-chain branch which is superior in processability and is suitable for extrusion molding, but, on the contrary, when the tan $\delta$ value is high, such as larger than 0.8, the copolymer has a linear structure and its processability may be low.

Meanwhile, in the elastic terpolymer of one embodiment, $\delta$ (delta) represents a phase angle at a certain angular frequency and means the reaction speed to stimulation, and $\Delta\delta$ (delta-delta) represents the change of the phase angle according to the change of the angular frequency. In addition, tan δ and Δ tan δ mean the tangent value of said δ and Δδ, and the tan δ value may be represented by G"/G' when G" is the loss modulus and G' is the storage modulus. Each tan δ value of the terpolymer may be measured by using a rubber process analyzer (RPA 2000 model) of Monsanto Co.

Further, the Δ tan δ value is the difference between the tan δ values at lower angular frequency and higher angular frequency, and it may be related to the degree of the long-chain branch and the extrusion behavior of the elastic terpolymer. More specifically, since the tan δ value represents the ratio of the loss modulus that is proportional to viscosity and the storage modulus that is proportional to elasticity, the terpolymer may show the characteristics of low viscosity and increased elasticity as the tan δ value becomes low. The terpolymer having a high degree of the long-chain branch can also show such a low tan δ value because it shows a low loss modulus and a high storage modulus. Therefore, the lower the Δ tan δ, which is the difference between the tan δ values during the deformation, the higher the elasticity maintenance property, which means that the terpolymer includes a long-chain branch and can show excellent processability and mechanical properties suitable for extrusion molding.

That is, the elastic terpolymer is prepared by using a group 4 transition metal catalyst so as to have excellent productivity, yield rate, and mechanical properties, and can be used for the EPDM rubber very preferably because it has a certain range of weight average molecular weight and Δ tan δ value by including a specific diene and can show excellent processability, elasticity, and flexibility required for the EPDM rubber.

Meanwhile, the elastic terpolymer of one embodiment may have the molecular weight distribution (polydispersity index, PDI) of 2 to 6, and preferably 2 to 4. The molecular weight distribution (PDI) means the rate (Mw/Mn) of weight average molecular weight (Mw) per number average molecular weight (Mn). When the PDI is less than 2, it is difficult to introduce the long-chain branch to the polymer and the processability may decrease, and when the PDI is larger than 6, the processability is excellent but the surface characteristic may deteriorate because the low molecular weight polymer is included in the terpolymer and is separated during processing.

The elastic terpolymer of one embodiment may also have a density capable of satisfying the properties suitable for the EPDM rubber, for example, a density of about 0.840 to 0.895 g/cm³, or about 0.850 to 0.890 g/cm³.

Furthermore, the elastic terpolymer of one embodiment may have Mooney viscosity capable of satisfying the properties suitable for the EPDM rubber, for example, a Mooney viscosity (1+4 @ 125° C.) of about 1 to 180, about 5 to 150, or about 20 to 130.

Further, in the elastic terpolymer of one embodiment, the alpha-olefin may be one or more $C_3$-$C_{20}$ alpha-olefins such as propylene, 1-butene, 1-hexene, 1-octene, 1-pentene, 4-methyl-1-pentene, 1-hexene, 1-heptene, 1-decene, 1-undecene, 1-dodecene, 1-tridecene, 1-tetradecene, 1-pentadecene, 1-hexadecene, 1-heptadecene, 1-nonadecene, 9-methyl-1-decene, 11-methyl-1-dodecene, 12-ethyl-1-tetradecene, and so on. Among them, $C_3$-$C_{10}$ alpha-olefins, for example, propylene, 1-butene, 1-hexene, or 1-octene may be appropriately used.

Furthermore, as the diene, unconjugated diene-based monomers may be used. For example, 5-1,4-hexadiene, 1,5-heptadiene, 1,6-octadiene, 1,7-nonadiene, 1,8-decadiene, 1,12-tetradecadiene, 3-methyl-1,4,-hexadiene, 4-methyl-1,4-hexadiene, 5-methyl-1,4-hexadiene, 4-ethyl-1, 4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5,-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 7-methyl-1,6-octadiene, 4-methyl-1,4-nonadiene, ethylidene-2-norbornene, 5-methylene-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, 5-propylidene-2-norbornene, 5-isopropylidene-2-norbornene, 5-butylidene-2-norbornene, 5-isobutylidene-2-norbornene, 2,3-diisopropylidene-5-norbornene, 2-ethylidene-3-isopropylidene-5-norbornene, or 2-propenyl-2,2-norbornadiene may be used, and one or more dienes selected from them may be used.

Particularly, the elastic terpolymer of one embodiment satisfying the weight average molecular weight and Δ tan δ may be prepared by using 5-ethylidene-2-norbornene, 5-methylene-2-norbornene, or 4-hexadiene preferably among the dienes. Meanwhile, since 5-vinyl-2-norbornene (VNB) or dicyclopentadiene (DCPD) that have been used for preparing the existing elastic terpolymer includes 2 double bonds and said 2 double bonds participate in the polymerization reaction and form a cross-linked polymer structure, there are some limits that gel particles are formed in the polymerization process or it is difficult to control the molecular weight of the terpolymer and the polymerization reaction.

Meanwhile, according to another embodiment of the invention, a method of preparing said elastic terpolymer of one embodiment is provided. The method of preparing the elastic terpolymer may include the step of copolymerizing the monomer composition including 40 to 70 weight % of ethylene, 20 to 50 weight % of a $C_3$-$C_{20}$ alpha-olefin, and 2 to 20 weight % of a diene while continuously feeding the composition into a reactor, in the presence of the catalyst composition including the first transition metal compound represented by the following Chemical Formula 1 and the second transition metal compound represented by the following Chemical Formula 2.

[Chemical Formula 1]

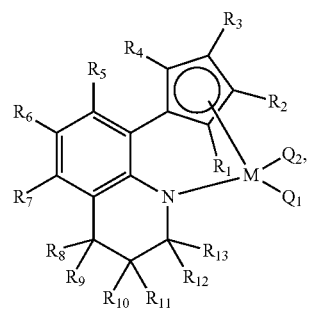

-continued

[Chemical Formula 2]

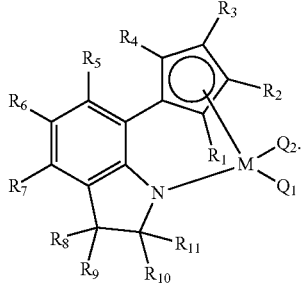

In Chemical Formulae 1 and 2, $R_1$ to $R_{13}$ may be equal to or different from each other, and may independently be hydrogen, a $C_1$-$C_{20}$ alkyl radical, a $C_2$-$C_{20}$ alkenyl radical, a $C_6$-$C_{20}$ aryl radical, a silyl radical, a $C_7$-$C_{20}$ alkylaryl radical, a $C_7$-$C_{20}$ arylalkyl radical, or a metalloid radical of a group 4 metal substituted with a hydrocarbyl, wherein the 2 different neighboring groups among $R_1$ to $R_{13}$ may form an aliphatic ring or an aromatic ring by being connected with an alkylidene radical including a $C_1$-$C_{20}$ alkyl or a $C_6$-$C_{20}$ aryl radical;

M is a group 4 transition metal; and $Q_1$ and $Q_2$ may be equal to or different from each other, and may independently be a halogen radical, a $C_1$-$C_{20}$ alkyl radical, a $C_2$-$C_{20}$ alkenyl radical, a $C_6$-$C_{20}$ aryl radical, a $C_7$-$C_{20}$ alkylaryl radical, a $C_7$-$C_{20}$ arylalkyl radical, a $C_1$-$C_{20}$ alkylamido radical, a $C_6$-$C_{20}$ arylamido radical, or a $C_1$-$C_{20}$ alkylidene radical.

As recognized in the below examples, the elastic terpolymer of one embodiment satisfying said high molecular weight range and $\Delta$ tan $\delta$ of 0.5 or less that is the difference between the tan $\delta$ values at the angular frequencies of 0.2 rad/s and 100.0 rad/s can be obtained with a high yield rate and productivity by using a certain content of monomers, namely, about 40 to 70 weight % or about 50 to 70 weight % of ethylene, about 15 to 55 weight % or about 25 to 45 weight % of a $C_3$-$C_{20}$ alpha-olefin, and about 0.5 to 20 weight % or about 2 to 10 weight % of a diene, and copolymerizing the monomers in the presence of 2 kinds of specific transition metal catalysts represented by Chemical Formulae 1 and 2.

This may be due to excellent catalytic activity of said 2 kinds of specific catalysts and reactivity of the comonomers. The specific catalysts of the first and second transition metal compounds show excellent catalytic activity as the group 4 transition metal catalyst, and can show excellent selectivity and copolymerization reactivity particularly to the comonomers such as alpha-olefins and dienes. Moreover, by using the 2 kinds of specific catalysts, it is possible to carry out the copolymerization so that the diene is uniformly distributed in the polymer chain with a relative high content. This seems to be because the surroundings of the metal sites of the specific catalysts of Chemical Formulae 1 and 2 are very stably maintained as a firm 5-membered ring and 6-membered ring structure by the quinoline-based amido group, and it has a structural characteristic that the monomers can easily approach. That is, the specific catalysts of Chemical Formulae 1 and 2 can form a long-chain branch-type macromer on the basis of said structural characteristic of the catalysts during the copolymerization of ethylene and alpha-olefin, and the macromer is further copolymerized by the reaction with the catalysts and can be made into the elastic terpolymer having a long-chain branch.

Moreover, said comonomers, especially dienes, can be distributed in the polymer chain more uniformly by using the 2 kinds of specific catalysts of the first and second transition metal compounds and carrying out the copolymerization with a continuous process while continuously providing the monomer composition including the monomers into the polymerization reactor.

As a result, it is possible to prepare the elastic terpolymer having high molecular weight in which the monomers are uniformly and alternately distributed and the degree of long-chain branch is high with high productivity and yield rate. Further, the elastic terpolymer can show low difference between tan $\delta$ values at different specific angular frequencies and thus can satisfy excellent processability and flexibility at the same time, in addition to excellent mechanical properties due to the molecular weight.

In addition, by controlling the content of the monomers to be in the optimum range of about 40 to 70 weight % or about 50 to 70 weight % of ethylene, about 15 to 55 weight % or about 25 to 45 weight % of a $C_3$-$C_{20}$ alpha-olefin, and about 0.5 to 20 weight % or about 2 to 10 weight % of a diene, the monomers can be distributed in the polymer chain more uniformly and alternately, and it becomes possible to prepare the elastic terpolymer of one embodiment effectively satisfying the characteristics disclose above.

Therefore, according to the preparation method of another embodiment, the elastic terpolymer of one embodiment disclosed above can be prepared with high productivity and yield rate, and the elastic terpolymer can be used very preferably as the EPDM rubber that is prepared by using the group 4 transition metal catalyst and satisfies excellent mechanical properties and more improved elasticity at the same time.

However, in the cases of not using the 2 kinds of specific catalysts disclosed above, when using only one kind of the catalyst, or getting out the proper content range of the monomers, especially diene, disclosed above, the elastic terpolymer prepared finally may not satisfy the high molecular weight range or the $\Delta$ tan $\delta$ value range at the specific angular frequencies and the like of one embodiment.

In the method of preparing the elastic terpolymer of another embodiment, the first and second transition metal compounds represented by Chemical Formulae 1 and 2 are explained in more detail as follows.

First, in Chemical Formulae 1 and 2, the hydrocarbyl may refer to a monovalent functional group of hydrocarbons from which hydrogen atoms are eliminated, for example, it may inclusively refer to an alkyl such as ethyl and so on or an aryl such as phenyl and so on.

Further, the metalloid in Chemical Formulae 1 and 2 is an element showing intermediate characteristics of a metal and a non-metal, for example it may refer to arsenic, boron, silicon, tellurium, and so on. And said M, for example, may refer to a group 4 transition metal element such as titanium, zirconium, hafnium, and so on.

Among the first and second transition metal compounds, one or more compounds selected from the group consisting of the compounds represented by the following formulae may be suitably used as the first transition metal compound of Chemical Formula 1.

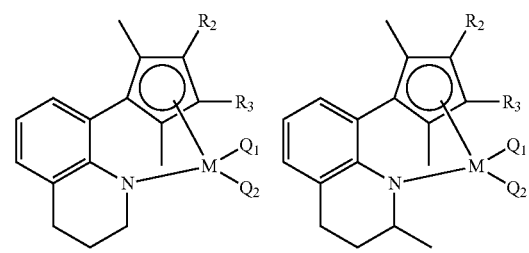
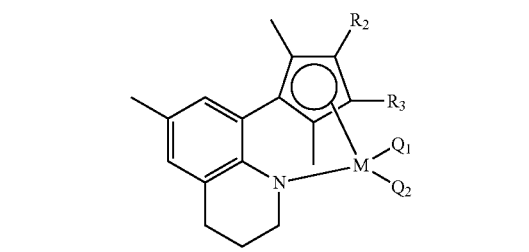
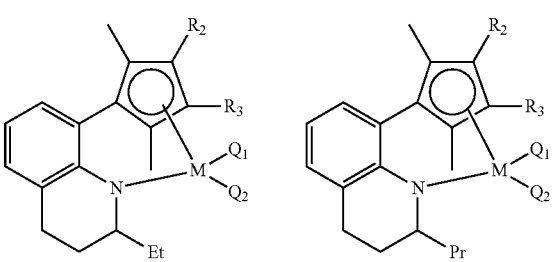
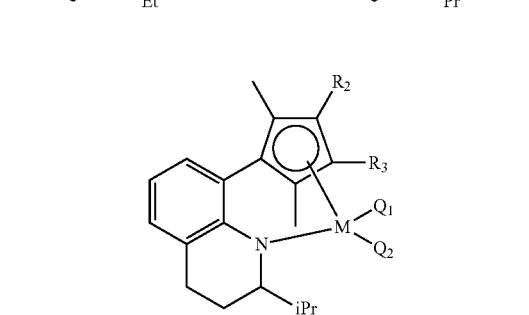
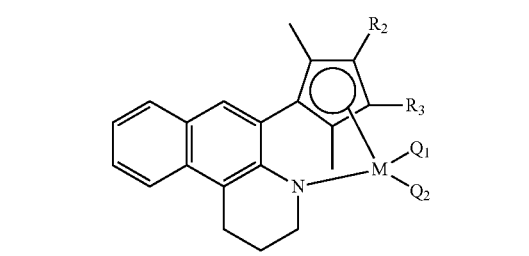
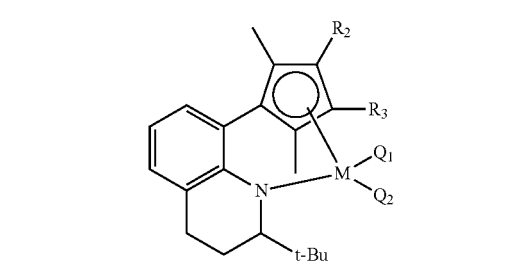

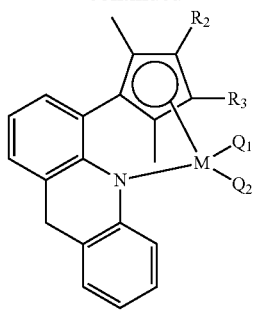
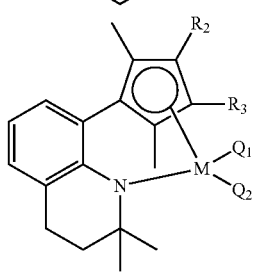
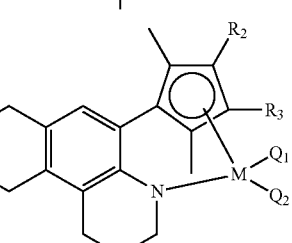
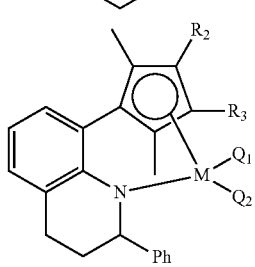
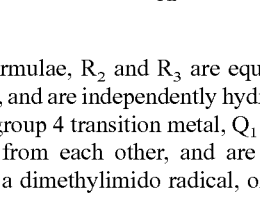

In the above formulae, $R_2$ and $R_3$ are equal to or different from each other, and are independently hydrogen or a methyl radical, M is a group 4 transition metal, $Q_1$ and $Q_2$ are equal to or different from each other, and are independently a methyl radical, a dimethylimido radical, or a chlorine radical.

Furthermore, as the second transition metal compound of Chemical Formula 2, one or more compounds selected from the group consisting of the compounds represented by the following formulae may be suitably used.

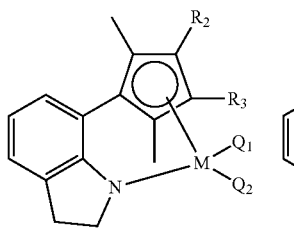
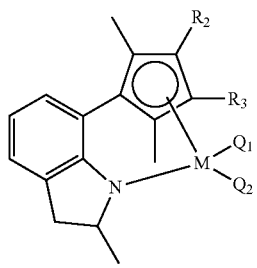

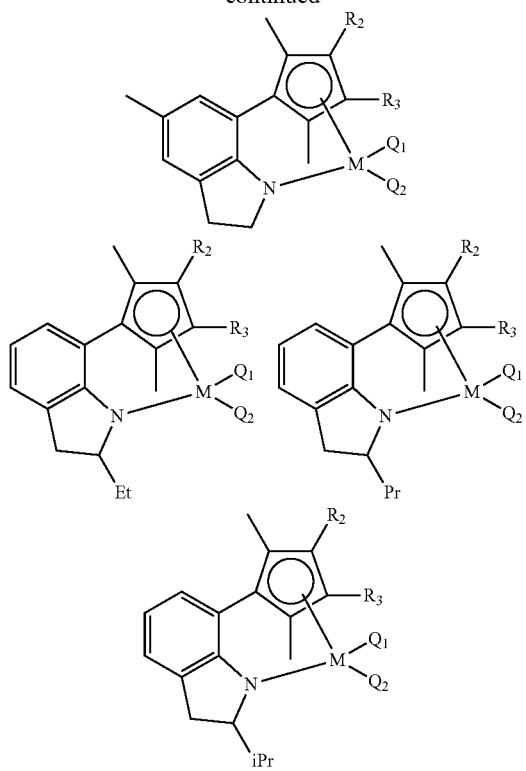
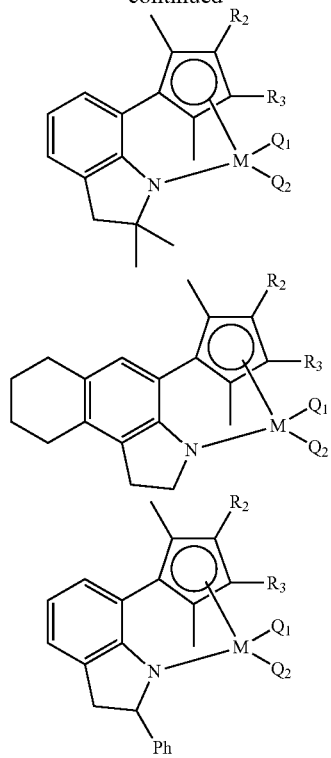

In the above formulae, $R_2$ and $R_3$ are equal to or different from each other, and are independently hydrogen or a methyl radical, M is a group 4 transition metal, and $Q_1$ and $Q_2$ are equal to or different from each other, and are independently a methyl radical, a dimethylimido radical, or a chlorine radical.

Meanwhile, the catalyst composition used in the preparation method of another embodiment may further include one or more cocatalyst compounds selected from the group consisting of the compounds represented by the following Chemical Formulae 3 to 5 in addition to the first and second transition metal compounds.

$$—[Al(R)—O]_n—$$ [Chemical Formula 3]

In Chemical Formula 3, R's are equal to or different from each other, and are independently a halogen, a $C_1$-$C_{20}$ hydrocarbon, or a $C_1$-$C_{20}$ hydrocarbon substituted with a halogen; and n is an integer of 2 or more.

$$D(R)_3$$ [Chemical Formula 4]

In Chemical Formula 4, R's are the same as defined in Chemical Formula 3; and D is aluminum or boron.

$$[L-H]^+[ZA_4]^- \text{ or } [L]^+[ZA_4]^-$$ [Chemical Formula 5]

In Chemical Formula 5, L is a neutral or cationic Lewis acid; H is a hydrogen atom; Z is a group 13 element; A's are equal to or different from each other, and are independently a $C_6$-$C_{20}$ aryl group or a $C_1$-$C_{20}$ alkyl group of which one or more hydrogen atoms are substituted with a halogen, a $C_1$-$C_{20}$ hydrocarbon, an alkoxy, or a phenoxy, or are not substituted.

In such cocatalyst compounds, for example, methylaluminoxane, ethylaluminoxane, isobutylaluminoxane, butylaluminoxane, and so on may be used as the compound represented by Chemical Formula 3.

Further, for example, trimethyl aluminum, triethyl aluminum, triisobutyl aluminum, tripropyl aluminum, tributyl aluminum, dimethylchloro aluminum, triisopropyl aluminum, tri-s-butyl aluminum, tricyclopentyl aluminum, tripentyl aluminum, triisopentyl aluminum, trihexyl aluminum, trioctyl aluminum, ethyldimethyl aluminum, methyldiethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron, and so on may be used as the compound represented by Chemical Formula 4, and among them, trimethyl aluminum, triethyl aluminum, or triisobutyl aluminum may be suitably used.

In addition, the compound represented by Chemical Formula 5 includes a non-coordinating anion which can coexist with a cation, such as a Bronsted acid. A suitable anion is one with a relatively large size and includes a single coordinating complex compound including a metalloid. Particularly, a compound including a single boron atom in the anion part is widely being used. In this respect, as the compound represented by Chemical Formula 5, a salt having an anion including a coordinating complex compound including single boron atom may be suitably used.

In the case of the trialkylammonium salt, for example, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(2-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-triisopropylsilyl)-2,3,5,6-tetrafluorophenyl)borate, N,N-dimethylanilinium pentafluorophenoxy tris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4,6-tetrafluorophenyl)borate, decyldimethylammonium tetrakis(pentafluorophenyl)borate, dodecyldimethylammonium tetrakis(pentafluorophenyl)borate, tetradecyldimethylammonium tetrakis(pentafluorophenyl)borate, hexadecyldimethylammonium tetrakis(pentafluorophenyl)borate, octadecyldimethylammonium tetrakis(pentafluorophenyl)borate, eicosyldimethylammonium tetrakis(pentafluorophenyl)borate, methyldidecylammonium tetrakis(pentafluorophenyl)borate, methyldidodecylammonium tetrakis(pentafluorophenyl)borate, methylditetradecylammonium tetrakis(pentafluorophenyl)borate, methyldihexadecylammonium tetrakis(pentafluorophenyl)borate, methyldioctadecylammonium tetrakis(pentafluorophenyl)borate, methyldieicosylammonium tetrakis(pentafluorophenyl)borate, tridecylammonium tetrakis(pentafluorophenyl)borate, tridodecylammonium tetrakis(pentafluorophenyl)borate, tritetradecylammonium tetrakis(pentafluorophenyl)borate, trihexadecylammonium tetrakis(pentafluorophenyl)borate, trioctadecylammonium tetrakis(pentafluorophenyl)borate, trieicosylammonium tetrakis(pentafluorophenyl)borate, decyldi(n-butyl)ammonium tetrakis(pentafluorophenyl)borate, dodecyldi(n-butyl)ammonium tetrakis(pentafluorophenyl)borate, cotadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl)borate, methyldi(dodecyl)ammonium tetrakis(pentafluorophenyl)borate, and so on may be used.

In the case of the dialkylammonium salt, for example, di-(i-propyl)ammonium tetrakis(pentafluorophenyl)borate, dicyclohexylammonium tetrakis(pentafluorophenyl)borate, and so on may be used.

In the case of carbonium salt, for example, tropylium tetrakis(pentafluorophenyl)borate, triphenylmethylium tetrakis(pentafluorophenyl)borate, benzene(diazonium) tetrakis(pentafluorophenyl)borate, and so on may be used.

Meanwhile, in the above preparation method of the elastic terpolymer, for example, the catalyst composition may be prepared by the method including the steps of bringing the first and second transition metal compounds into contact with the cocatalyst compound of Chemical Formula 3 or Chemical Formula 4 so as to obtain a mixture thereof; and adding the cocatalyst of Chemical Formula 5 to the mixture.

In the catalyst composition, the mole ratio of the first transition metal compound to the second transition metal compounds may be about 10:1 to 1:10, the mole ratio of the total transition metal compound including the first and second transition metal compounds to the cocatalyst compound of Chemical Formula 3 or Chemical Formula 4 may be about 1:5 to 1:500, and the mole ratio of the total transition metal compound to the cocatalyst compound of Chemical Formula 5 may be about 1:1 to 1:10.

In the preparation method of the elastic terpolymer, the catalyst composition may further include a reaction solvent, and the reaction solvent may be a hydrocarbon solvent such as pentane, hexane, or heptane, or an aromatic solvent such as benzene or toluene, but it is not limited to them.

As disclosed above, propylene, 1-butene, 1-hexene, 1-octene, 1-pentene, 4-methyl-1-pentene, 1-hexene, 1-heptene, 1-decene, 1-undecene, 1-dodecene, and so on may be used as the alpha-olefin included in the monomer composition, and unconjugated diene-based monomers may be used as the diene. Among them, the monomers commonly used in the preparation of the EPDM rubber, for example, propylene, may be appropriately used as the alpha-olefin, and unconjugated diene-based monomers such as 5-ethylidene-2-norbornene, 5-methylene-2-norbornene, 4-hexadiene, and so on may be appropriately used as the diene.

In the preparation method of the terpolymer according to another embodiment, the copolymerizing step may be carried out at a temperature of about 100 to 170° C., or about 100 to 160° C. When the copolymerization temperature is too low, it may be difficult to synthesize the elastic terpolymer in which 3 kinds of monomers are uniformly and alternately distributed, and when the polymerization reaction temperature is too high, the monomer or the prepared terpolymer may be degraded by heat. Such copolymerization may be carried out according to a solution polymerization method, particularly, according to a continuous solution polymerization method. The catalyst composition disclosed above may be used in the form of a homogeneous catalyst that is dissolved in the solution.

For carrying out the continuous solution polymerization, the copolymerizing step may be carried out while continuously providing the monomer composition, the first and second transition metal compounds, and the catalyst composition selectively including the cocatalyst compound in the form of a liquid to the reactor, and the copolymerizing step may be continuously carried out while continuously discharging the copolymerized elastic terpolymer from the reactor.

By carrying out such continuous solution polymerization, the elastic terpolymer satisfying the characteristics of one embodiment can be obtained more effectively with high productivity and yield rate.

Advantageous Effects

According to the present invention, as disclosed above, the elastic terpolymer having a long-chain branch which shows excellent processability and more improved elasticity and flexibility and that can be very preferably used to the EPDM rubber is prepared by the group 4 transition metal catalyst.

Furthermore, according to the present invention, the preparation method of the elastic terpolymer which can prepare the elastic terpolymer with high productivity and yield rate is provided.

The elastic terpolymer having a long-chain branch obtained according to the present invention can overcome the limit of the EPDM rubber prepared by an existing metallocene group 4 transition metal catalyst and satisfy excellent elasticity and flexibility in addition to other properties. Therefore, it is possible to utilize the unique strengths of the group 4 transition metal catalyst and the elastic terpolymer can be used as the EPDM rubber very preferably.

DETAILED DESCRIPTION OF THE EMBODIMENTS

Figure 1:
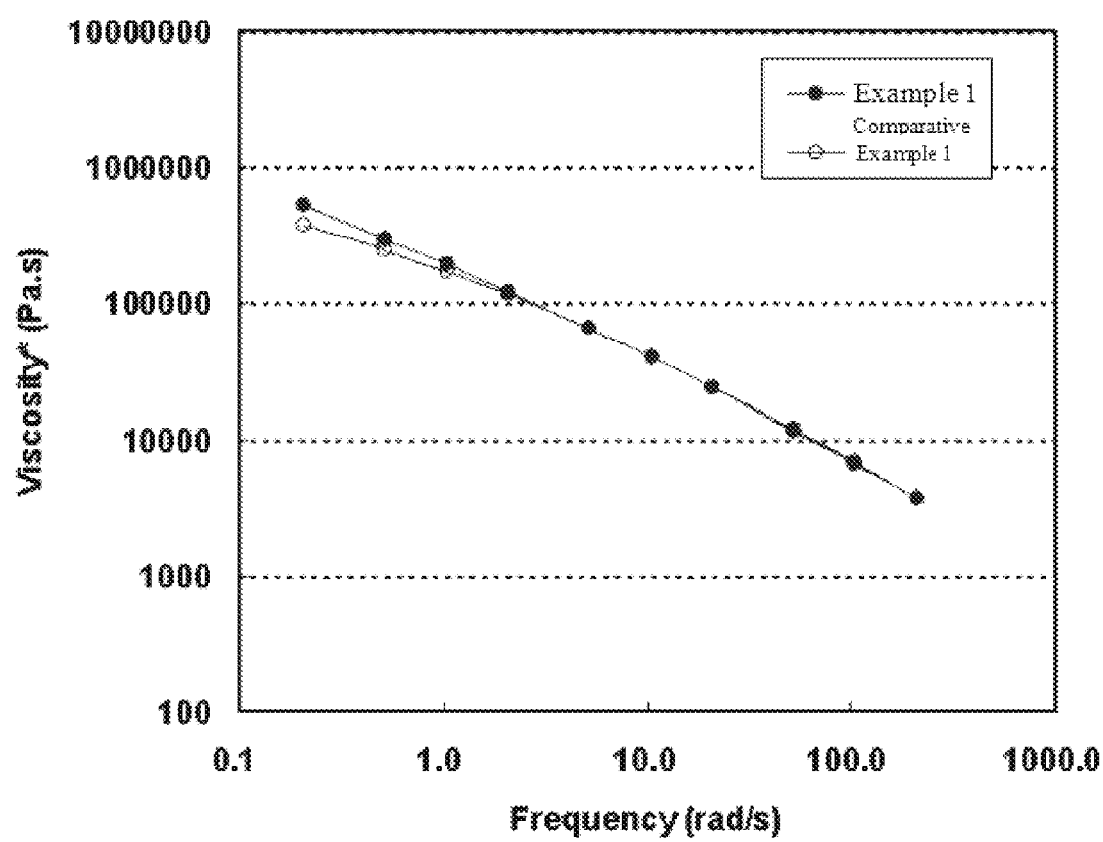
FIG. 1 is a graph of dynamic complex viscosity to angular frequency of the elastic terpolymers prepared in Example 1 and Comparative Example 1.

Hereinafter, the present invention is explained in more detail by referring to the following examples. However, the following examples are only for exemplifying the invention and the substance of the invention is not limited to or by them.

The following examples and comparative examples were carried out by using a standard Schlenk line and a glove-box under a nitrogen atmosphere for blocking the contact with air and moisture, and the organic solvent for the reaction was used after being purified by a standard method. The synthesized ligands and catalysts were confirmed by using a 400 MHz nuclear magnetic resonance (NMR) spectrometer and an X-ray spectrometer.

<Synthesis of Ligands and Transition Metal Compounds>

In the following examples, [(1,2,3,4-tetrahydroquinolin-8-yl)tetramethylcyclopentadienyl-eta5,kapa-N]titanium dimethyl and [(2-methylindolin-7-yl)tetramethylcyclopenta-dienyl-eta5,kapa-N]titanium dimethyl were used as the first and second transition metal compounds, respectively, and N,N-dimethylanilinium tetrakis(pentafluorophenyl)borate and triisobutyl aluminum were used as the cocatalyst compounds. The first and second transition metal compounds were prepared according to the same method as in Examples 2 and 14 of Korean Pat. No. 0,976,131, and the cocatalyst was prepared according to the same method as in Example 9 of Korean Pat. No. 0,820,542.

Examples 1 to 6

Preparation of the Elastic Terpolymer of Ethylene, Propylene, and 5-Ethylidene-2-Norbornene The copolymerization reaction of ethylene, propylene, and 5-ethylidene-2-norbornene was continuously carried out by using a 2 L pressure reactor. Hexane, as a polymerization solvent, was continuously fed to the reactor through the bottom with the feeding speed of 6.7 kg per hour, and the polymerized solution was continuously taken out through the upper part.

As the first and second transition metal compounds, said [(1,2,3,4-tetrahydroquinolin-8-yl)tetramethylcyclopentadienyl-eta5,kapa-N]titanium dimethyl and [(2-methylindolin-7-yl)tetramethylcyclopentadienyl-eta5,kapa-N]titanium dimethyl were used in the form of being dissolved in hexane, and they were fed to the reactor with the feeding speed of 24 to 60 μmol per hour. As the cocatalyst compound, said N,N-dimethylanilinium tetrakis(pentafluorophenyl)borate was used in the form of being dissolved in toluene, and it was fed to the reactor with the feeding speed of 1800 to 3200 μmol per hour.

The copolymerization was carried out while continuously feeding ethylene, propylene, and 5-ethylidene-2-norbornene, the monomers, to the reactor with the feeding speed of 890 to 900 g per hour, 450 to 550 g per hour, and 80 to 250 g per hour, respectively.

The copolymerization temperature in the reactor was controlled to be 130 to 160° C. while increasing the feeding speed of 5-ethylidene-2-norbornene by 0.5 mL/min from 1 mL/min around 160° C.

The elastic terpolymers of Examples 1 to 6 were continuously prepared in the form of homogeneous solution by carrying out the continuous solution copolymerization under the conditions disclosed above, and the polymerized solutions taken out through the upper part of the reactor were made into the terpolymers of Examples 1 to 6 after being vacuum dried in a vacuum oven at 60° C. after the polymerization reaction was terminated in the presence of ethanol.

Comparative Examples 1 and 2

Commercialized Elastic Terpolymer of Ethylene, Propylene, and 5-Ethylidene-2-Norbornene DOW 4570, the commercialized EPDM rubber prepared by a metallocene catalyst, was used as the elastic terpolymer of Comparative Example 1, and DOW 4640 was used as the elastic terpolymer of Comparative Example 2.

The content of each monomer, activity of catalyst, weight average molecular weight, and molecular weight distribution (PDI) of the terpolymers obtained in the examples and comparative examples are listed in the following Table 1. Here, the weight average molecular weight was measured by PL-GPC 220 equipment of Polymer Laboratory Co. equipped with 3 linear-mixed bed columns, at 160° C. with the flow rate of 1.0 ml/min by using 1,2,4-trichlorobenzene as the solvent.

TABLE 1

|  | Polymerization Temperature (° C.) | Activity of Catalyst (kg/mmol · h) | ethylene (wt %) | propylene (wt %) | 5-ethylidene-2-norbornene (wt %) | Mw (g/mol) | PDI |
|---|---|---|---|---|---|---|---|
| Example 1 | 135 | 18.3 | 50.2 | 44.7 | 5.1 | 256,756 | 2.83 |
| Example 2 | 135 | 48.2 | 51.8 | 42.6 | 4.7 | 194,077 | 2.82 |
| Example 3 | 153 | 43.3 | 62.3 | 25.4 | 12.3 | 289,000 | 3.15 |
| Example 4 | 160 | 40.0 | 64.0 | 23.7 | 12.3 | 229,000 | 2.62 |
| Example 5 | 159 | 30.7 | 64.6 | 23.5 | 11.9 | 224,375 | 3.43 |
| Example 6 | 158 | 29.6 | 66.3 | 21.9 | 11.8 | 267,000 | 2.73 |
| Comparative Example 1 |  |  | 47.2 | 47.5 | 5.3 | 253,740 | 2.41 |
| Comparative Example 2 |  |  | 51.2 | 436. | 5.2 | 209,000 | 2.97 |

Experimental Example 1

Measurement of Dynamic Complex Viscosity and Tan δ

Dynamic complex viscosity and tan δ were measured according to ASTM D6204-01 by using a rubber process analyzer. The RPA2000 MV 2000E model of Monsanto Co. was used. The terpolymer samples were treated with an antioxidant (Irganox 1076) and made into sheets by using a press mold. The dynamic complex viscosity and tan δ were measured at the strain of 7% and the frequency range of 0.1-210 rad/s at 100° C.

between 0.2 rad/s and 104.7 rad/s have a linear structure but the terpolymers of Examples 1 to 6 showing low Δ tan δ of 0.5 or less are the EPDM structures having a long-chain branch.

Furthermore, from the examples, it is possible to recognize that the elastic terpolymer having a long-chain branch can be prepared by using the 5-ethylidene-2-norbornene monomer, which could not have formed a long-chain branch and showed low processability in the existing EPDM polymerization, with said group 4 transition metal catalyst and specific polymerization system.

TABLE 2

| Angular Frequency (rad/s) | tanδ |  |  |  |  |  |  |  |
|---|---|---|---|---|---|---|---|---|
|  | Example 1 | Example 2 | Example 3 | Example 4 | Example 5 | Example 6 | Comparative Example 1 | Comparative Example 2 |
| 0.2 | 0.489 | 0.774 | 0.518 | 0.587 | 0.630 | 0.625 | 1.161 | 1.95 |
| 0.5 | 0.466 | 0.721 | 0.506 | 0.568 | 0.606 | 0.599 | 0.993 | 1.043 |
| 1.0 | 0.460 | 0.704 | 0.503 | 0.561 | 0.598 | 0.577 | 0.864 | 0.936 |
| 2.1 | 0.457 | 0.694 | 0.495 | 0.552 | 0.584 | 0.547 | 0.741 | 0.843 |
| 5.2 | 0.488 | 0.677 | 0.473 | 0.525 | 0.554 | 0.498 | 0.593 | 0.723 |
| 10.5 | 0.435 | 0.650 | 0.446 | 0.493 | 0.519 | 0.454 | 0.496 | 0.638 |
| 20.9 | 0.411 | 0.607 | 0.409 | 0.451 | 0.473 | 0.405 | 0.412 | 0.555 |
| 52.4 | 0.370 | 0.535 | 0.355 | 0.362 | 0.407 | 0.341 | 0.321 | 0.455 |
| 104.7 | 0.334 | 0.474 | 0.313 | 0.341 | 0.357 | 0.296 | 0.265 | 0.387 |
| 209.4 | 0.293 | 0.410 | 0.269 | 0.291 | 0.305 | 0.251 | 0.217 | 0.327 |
| *Δtanδ | 0.155 | 0.300 | 0.205 | 0.246 | 0.273 | 0.329 | 0.896 | 0.808 |
| MWD | 2.83 | 2.82 | 3.15 | 2.75 | 2.73 | 2.75 | 2.50 | 1.75 |

*Δtanδ is the difference between the tanδ values corresponding to the angular frequencies of 104.7 and 0.2 rad/s.

Figure 2:
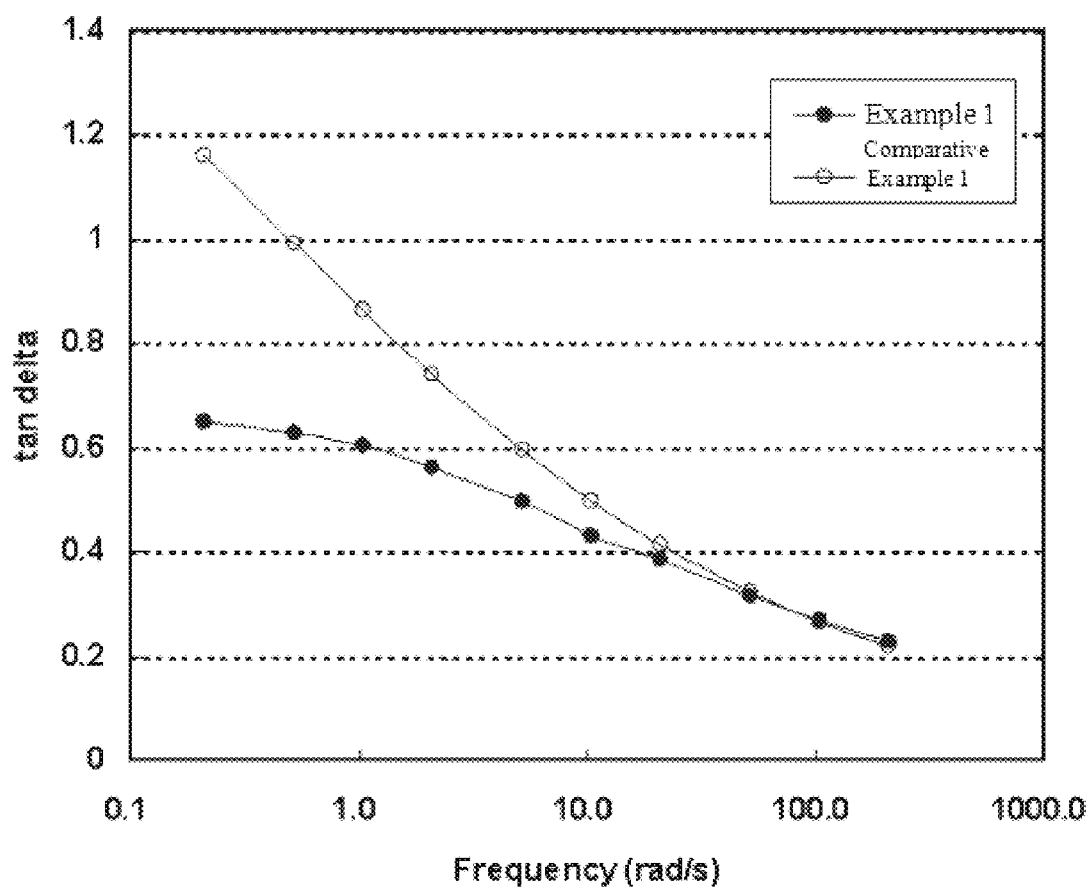
FIG. 2 is a graph of tan δ to angular frequency of the elastic terpolymers prepared in Example 1 and Comparative Example 1.

As illustrated in FIGS. 1 and 2, Example 1 and Comparative Example 1 show similar variation of the dynamic complex viscosity to the angular frequency, but it is possible to recognize that Example 1 shows apparently smaller variation in the tan δ value according to the variation of the angular frequency than Comparative Example 1. Particularly, it is also possible to recognize that Example 1 and Comparative Example 1 show very large difference in the tan δ value at the angular frequency of 0.2 rad/s.

Furthermore, as listed in Table 2, not only Example 1 but also Examples 2 to 6 show apparently smaller variation in the tan δ value according to the variation of the angular frequency than Comparative Examples 1 and 2, and particularly, it is possible to recognize that the difference of the tan δ values at 0.2 rad/s and 104.7 rad/s is 0.5 or less which is very small.

From said results, it is possible to infer that the terpolymers of the comparative examples showing high Δ tan δ

Experimental Example 2

Garvey-Die Extrusion Test

Figure 3:
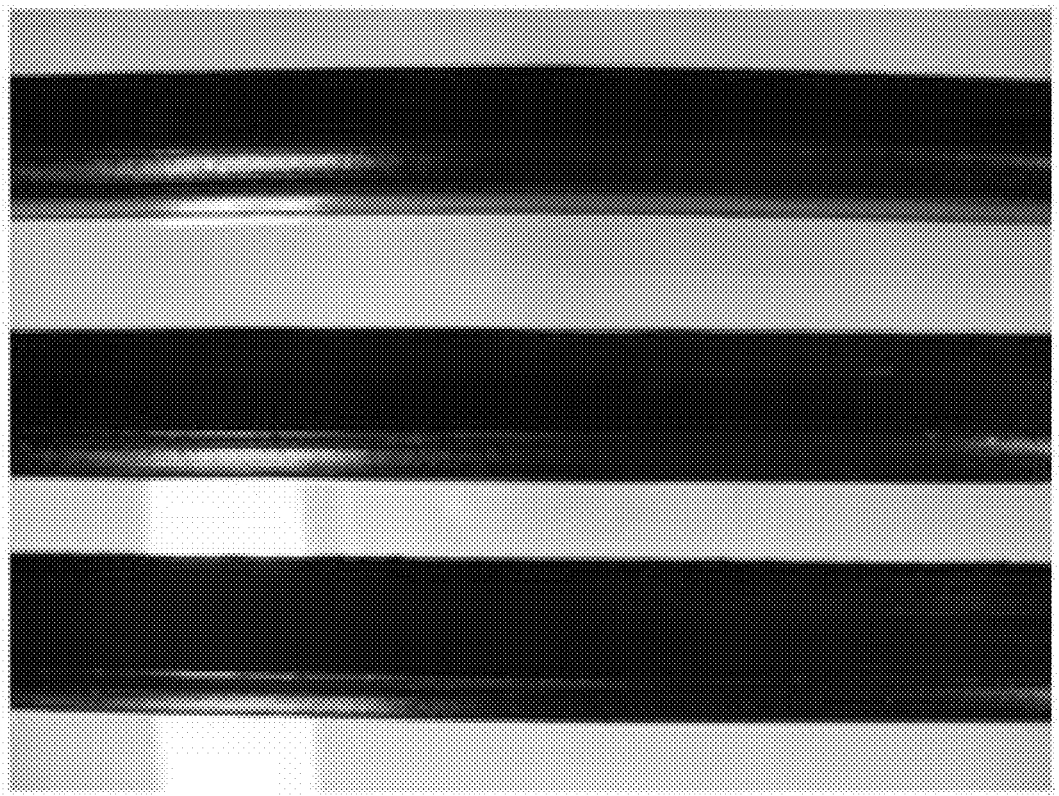
FIG. 3 is a surface photograph of the extrudate of the elastic terpolymer prepared in Example 1 that is extruded through a Garvey die with a rotor speed of 60 rpm.
Figure 4:
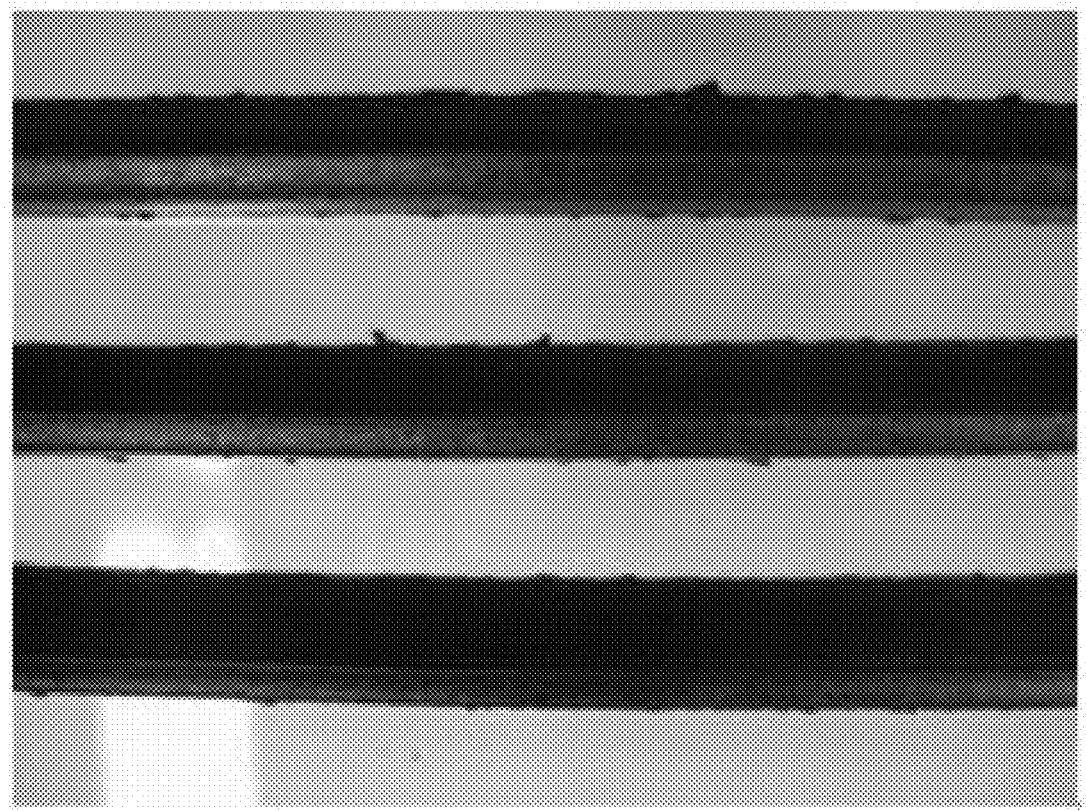
FIG. 4 is a surface photograph of the extrudate of the elastic terpolymer prepared in Comparative Example 1 that is extruded through a Garvey die with a rotor speed of 60 rpm.

The extrusion processability was evaluated by a Garvey die extrusion test according to ASTM 2230. The samples for the Garvey die extrusion test were prepared as follows. 100 parts by weight of the elastic terpolymers prepared in Examples 1 and 2 and Comparative Examples 1 and 2, 75 parts by weight of paraffin oil, 125 parts by weight of carbon black, 5 parts by weight of ZnO, and 1 part by weight of stearic acid were mixed by using a 1.6 L Banbury mixer of Farrell Co. with a rotor speed of 60 rpm for 6 min at 100 to 120° C. The mixtures were extruded through the Garvey die extruder at a die temperature of 105° C. by varying the rotor speed to 45 or 60 rpm, and the surface and edge characteristics were evaluated. The results of the Garvey die test of Examples 1 and 2 and Comparative Examples 1 and 2 are listed in Table 3, and the photographs of the surface of the Garvey die extrudates of the elastic terpolymers of Example 1 and Comparative Example 1 are illustrated in FIGS. 3 and 4, respectively.

TABLE 3

| Sample | Rotor Speed (rpm) | Extrusion Production | *Die expansion index | Surface Characteristic | Edge Characteristic |
|---|---|---|---|---|---|
| Example 1 | 45 | 35 | 0.34 | B | 9 |
|  | 60 | 43 | 0.45 | A | 9 |
| Example 2 | 45 | 54 | 0.41 | A | 9 |
|  | 60 | 62 | 0.45 | A | 10 |
| Comparative Example 1 | 45 | 33 | 0.32 | C | 6 |
|  | 60 | 49 | 0.41 | C | 7 |
| Comparative Example 2 | 45 | 51 | 0.44 | C | 7 |
|  | 60 | 60 | 0.49 | B | 7 |

*Die expansion index is the volume change per minute divided by the length change per minute during the extrusion.

Examples 1 and 2 and Comparative Examples 1 and 2 are samples having similar composition and Mooney viscosity, and, as shown in Table 3, it is possible to recognize that they show similar extrusion production and die expansion index but the surface characteristic of Examples 1 and 2 is apparently superior to those of Comparative Examples 1 and 2 when they are subjected to the Garvey die extrusion test.

Furthermore, from FIGS. 3 and 4, the photographs of the extrudates of Example 1 and Comparative Example 1, it is possible to recognize that the surface characteristic and the edge shape of Example 1 are more uniform and smooth than those of Comparative Example 1.

That is, it is possible to recognize that the elastic terpolymers of Examples 1 and 2 show superior extrusion processability and surface characteristic to the existing terpolymer including 5-vinyl-2-norbornene (VNB) or dicyclopentadiene (DCPD) as the diene, by introducing a long-chain branch thereto by using the specific diene and group 4 transition metal catalyst.

The invention claimed is:

1. An elastic terpolymer of 40 to 70 weight % of ethylene, 15 to 55 weight % of a $C_3$-$C_{20}$ alpha-olefin, and 0.5 to 20 weight % of a diene obtained in the presence of a group 4 transition metal catalyst, of which
   i) the weight average molecular weight measured by GPC is 100,000 to 500,000, and
   ii) Δ tan δ, the difference between the tan δ values at the angular frequencies of 0.2 rad/s and 100.0 rad/s measured at 100° C. by using a rubber process analyzer, is 0.5 or less.

2. The elastic terpolymer according to claim 1, wherein the tan δ value at the angular frequency of 0.2 rad/s is 0.45 to 0.8.

3. The elastic terpolymer according to claim 1, having density of 0.840 to 0.895 g/cm³.

4. The elastic terpolymer according to claim 1, having Mooney viscosity (1+4 @ 125° C.) of 5 to 180.

5. The elastic terpolymer according to claim 1, having a molecular weight distribution of 2 to 4.

6. The elastic terpolymer according to claim 1, wherein the alpha-olefin is one or more compounds selected from the group consisting of propylene, 1-butene, 1-hexene, and 1-octene, and the diene is one or more compounds selected from the group consisting of 5-ethylidene-2-norbornene, 5-methylene-2-norbornene, and 4-hexadiene.

7. A method of preparing the elastic terpolymer of claim 1, including copolymerizing the monomer composition including 40 to 70 weight % of ethylene, 20 to 50 weight % of a $C_3$-$C_{20}$ alpha-olefin, and 2 to 20 weight % of a diene while feeding the composition continuously into a reactor, in the presence of a catalyst composition including a first transition metal compound represented by the following Chemical Formula 1 and a second transition metal compound represented by the following Chemical Formula 2:

[Chemical Formula 1]

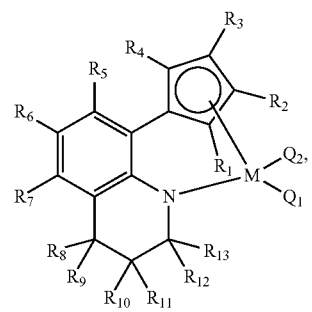

[Chemical Formula 2]

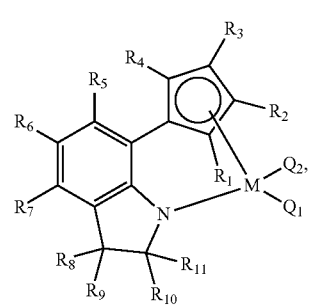

wherein, in Chemical Formulae 1 and 2, $R_1$ to $R_{13}$ may be equal to or different from each other, and may independently be hydrogen, a $C_1$-$C_{20}$ alkyl radical, a $C_2$-$C_{20}$ alkenyl radical, a $C_6$-$C_{20}$ aryl radical, a silyl radical, a $C_7$-$C_{20}$ alkylaryl radical, a $C_7$-$C_{20}$ arylalkyl radical, or a metalloid radical of a group 4 metal substituted with a hydrocarbyl, wherein the 2 different neighboring groups among $R_1$ to $R_{13}$ may form an aliphatic ring or an aromatic ring by being connected with an alkylidene radical including a $C_1$-$C_{20}$ alkyl or a $C_6$-$C_{20}$ aryl radical;

M is a group 4 transition metal; and $Q_1$ and $Q_2$ may be equal to or different from each other, and may independently be a halogen radical, a $C_1$-$C_{20}$ alkyl radical, a $C_2$-$C_{20}$ alkenyl radical, a $C_6$-$C_{20}$ aryl radical, a $C_7$-$C_{20}$ alkylaryl radical, a $C_7$-$C_{20}$ arylalkyl radical, a $C_1$-$C_{20}$ alkylamido radical, a $C_6$-$C_{20}$ arylamido radical, or a $C_1$-$C_{20}$ alkylidene radical.

8. The method according to claim 7, wherein the first transition metal compound is one or more compounds selected from the group consisting of compounds represented by the following chemical formulae:

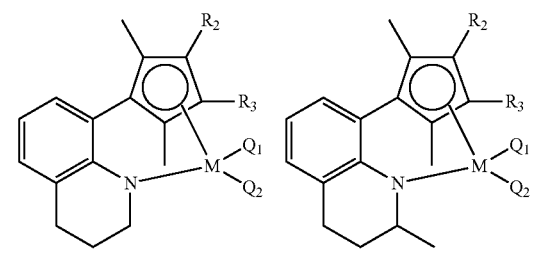
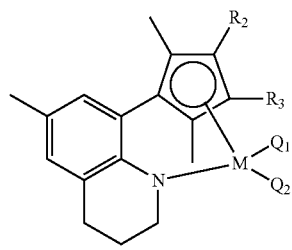
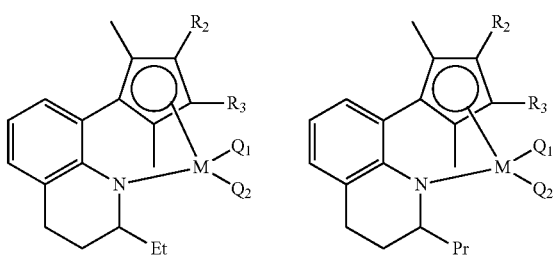
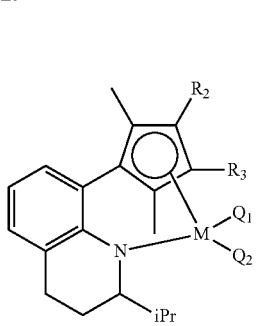
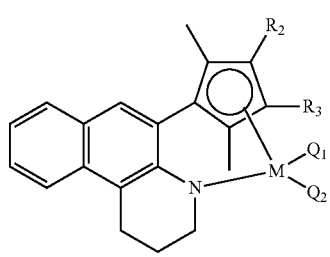
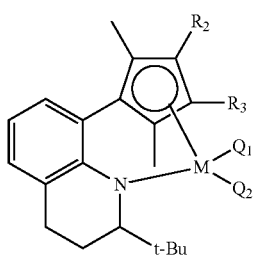

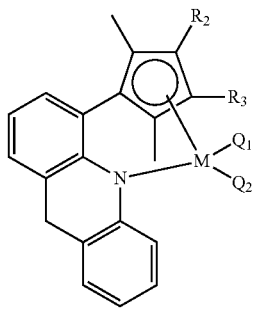
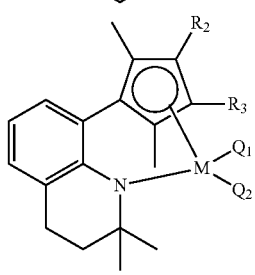
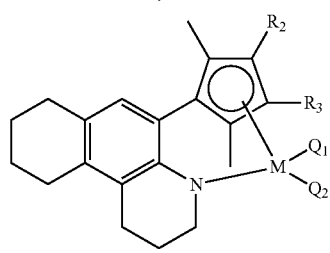
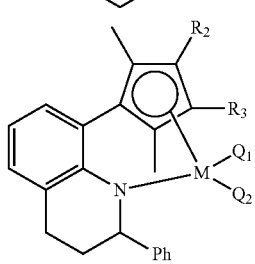

wherein, in above formulae, $R_2$ and $R_3$ are equal to or different from each other, and are independently hydrogen or a methyl radical, M is a group 4 transition metal, and $Q_1$ and $Q_2$ are equal to or different from each other, and are independently a methyl radical, a dimethylimido radical, or a chlorine radical.

9. The method according to claim 7, wherein the second transition metal compound is one or more compounds selected from the group consisting of compounds represented by the following chemical formulae:

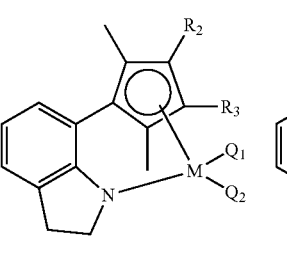

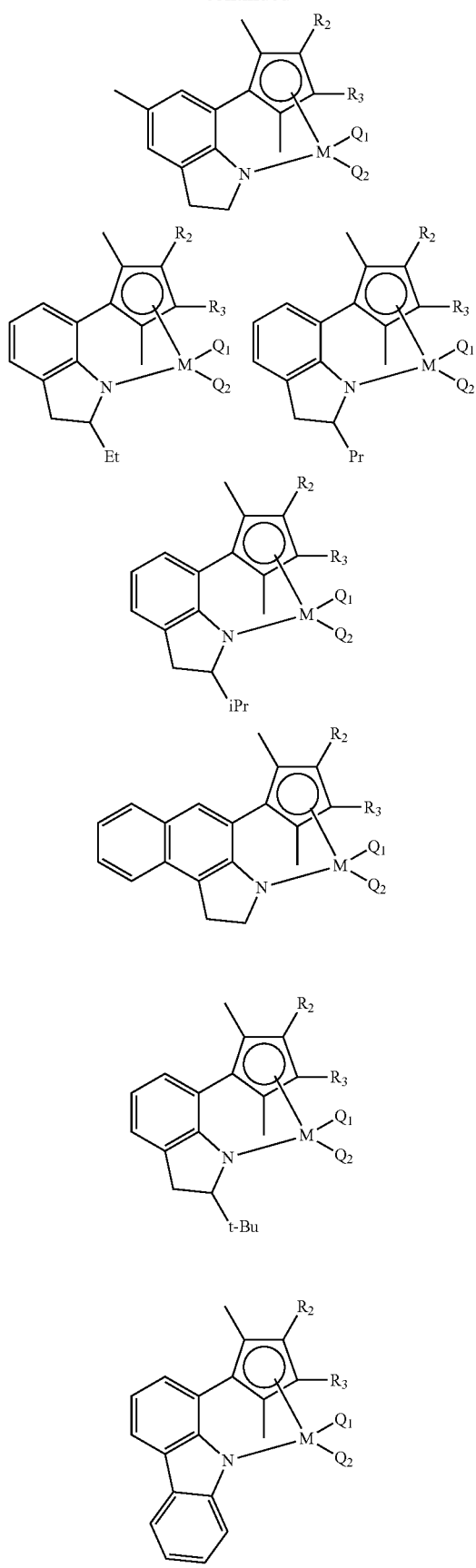

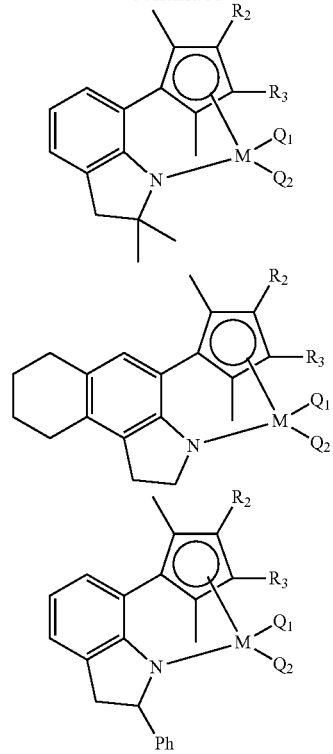

wherein, in above formulae, $R_2$ and $R_3$ are equal to or different from each other, and are independently hydrogen or a methyl radical, M is a group 4 transition metal, and $Q_1$ and $Q_2$ are equal to or different from each other, and are independently a methyl radical, a dimethylimido radical, or a chlorine radical.

10. The method according to claim 7, wherein the catalyst composition further includes one or more cocatalyst compounds selected from the group consisting of the compounds represented by the following Chemical Formulae 3 to 5:

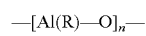   [Chemical Formula 3]

in Chemical Formula 3, R's are equal to or different from each other, and are independently a halogen, a $C_1$-$C_{20}$ hydrocarbon, or a $C_1$-$C_{20}$ hydrocarbon substituted with a halogen, and n is an integer of 2 or more;

   [Chemical Formula 4]

in Chemical Formula 4, R's are the same as defined in Chemical Formula 3, and D is aluminum or boron; and

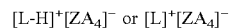   [Chemical Formula 5]

in Chemical Formula 5, L is a neutral or cationic Lewis acid, H is a hydrogen atom, Z is a group 13 element, and A's are equal to or different from each other, and are independently a $C_6$-$C_{20}$ aryl group or a $C_1$-$C_{20}$ alkyl group of which one or more hydrogen atoms are substituted with a halogen, a $C_1$-$C_{20}$ hydrocarbon, an alkoxy, or a phenoxy, or are not substituted.

11. The method according to claim 7, wherein the alpha-olefin is one or more compounds selected from the group consisting of propylene, 1-butene, 1-hexene, and 1-octene, and the diene is one or more compounds selected from the group consisting of 5-ethylidene-2-norbornene, 5-methylene-2-norbornene, and 4-hexadiene.

12. The method according to claim 10, wherein the copolymerizing step is carried out while continuously providing the monomer composition, the first and second transition metal compounds, and the cocatalyst compound in the form of a liquid to the reactor.

13. The method according to claim 12, wherein the copolymerizing step is continuously carried out while continuously discharging the copolymerized elastic terpolymer from the reactor.

14. The method according to claim 7, continuously the copolymerizing step is carried out at a temperature of 100 to 170° C.

* * * * *